United States Patent
Sung et al.

(10) Patent No.: US 7,564,909 B2
(45) Date of Patent: Jul. 21, 2009

(54) APPARATUS AND METHOD FOR DETECTING RANGING SIGNAL IN AN ORTHOGONAL FREQUENCY DIVISION MULTIPLE ACCESS MOBILE COMMUNICATION SYSTEM

(75) Inventors: Sang-Hoon Sung, Suwon-si (KR);
In-Seok Hwang, Seoul (KR);
Soon-Young Yoon, Seoul (KR);
Chung-Ryul Chang, Seoul (KR);
Jae-Hee Cho, Seoul (KR); Hoon Huh,
Sungnam-si (KR)

(73) Assignee: Samsung Electronics Co., Ltd. (KR)

( * ) Notice: Subject to any disclaimer, the term of this patent is extended or adjusted under 35 U.S.C. 154(b) by 609 days.

(21) Appl. No.: 11/249,065

(22) Filed: Oct. 12, 2005

(65) Prior Publication Data
US 2006/0098749 A1 May 11, 2006

(30) Foreign Application Priority Data
Oct. 12, 2004 (KR) .................... 10-2004-0081326

(51) Int. Cl.
*H04K 1/10* (2006.01)
(52) U.S. Cl. .................. 375/260; 375/259; 375/316; 370/329; 370/328; 370/310; 370/210; 370/203
(58) Field of Classification Search ............ 375/260, 375/259, 316; 370/329, 328, 310, 210, 203
See application file for complete search history.

(56) References Cited

U.S. PATENT DOCUMENTS

| 2002/0122381 A1* | 9/2002 | Wu et al. | 370/208 |
| 2004/0091057 A1* | 5/2004 | Yoshida | 375/260 |
| 2004/0095907 A1* | 5/2004 | Agee et al. | 370/334 |
| 2005/0286465 A1* | 12/2005 | Zhuang | 370/329 |

\* cited by examiner

*Primary Examiner*—David C Payne
*Assistant Examiner*—Zewdu Kassa
(74) *Attorney, Agent, or Firm*—The Farrell Law Firm, LLP

(57) ABSTRACT

An apparatus and method for receiving a ranging signal in an OFDMA mobile communication system are provided. The ranging signal receiving apparatus including, a ranging sub-channel extractor for extracting subcarrier values with a ranging signal from a (FFT) signal; a plurality of multipliers for code-demodulating the sub-carrier values by multiplying them by a plurality of ranging codes; each of a plurality of correlators for calculating a plurality of differential correlations in a code-demodulated signal received from a corresponding multiplier; each of a plurality of inverse fast Fourier transform (IFFT) processors for IFFT-processing differential correlations received from a corresponding correlator by mapping the differential correlations to predetermined subcarriers and each of a plurality of maximum value detectors for detecting a maximum value in an IFFT signal received from a corresponding IFFT processor and calculating a timing offset using an IFFT output index having the maximum value.

22 Claims, 8 Drawing Sheets

APPARATUS AND METHOD FOR DETECTING RANGING SIGNAL IN AN ORTHOGONAL FREQUENCY DIVISION MULTIPLE ACCESS MOBILE COMMUNICATION SYSTEM

PRIORITY

This application claims priority under 35 U.S.C. § 119 to an application entitled "Apparatus And Method For Detecting Ranging Signal In An Orthogonal Frequency Division Multiple Access Mobile Communication System" filed in the Korean Intellectual Property Office on Oct. 12, 2004 and assigned Ser. No. 2004-81326, the contents of which are incorporated herein by reference.

BACKGROUND OF THE INVENTION

1. Field of the Invention

The present invention relates generally to a receiving apparatus and method for a base station (BS) in an Orthogonal Frequency Division Multiplexing (OFDM)-based broadband mobile communication system, and more particularly, to an apparatus and method for receiving a ranging signal in an Orthogonal Frequency Division Multiple Access (OFDMA) communication system.

2. Description of the Related Art

In a communication system which is defined by an Institute of Electronics and Electrical Engineers (IEEE) 802.16d/e standard, a BS acquires uplink timing synchronization and tracks Carrier-to-Interference plus Noise Ratio (CINR) using a known signal (e.g. a ranging signal, a preamble, a pilot signal, etc.) received from a subscriber station (SS). A signal that the SS transmits to help the BS to acquire the uplink timing synchronization is known as a "ranging signal". Conventional ranging signal reception will now be described, according to the IEEE 802.16d/e standard.

FIG. 1 is a block diagram schematically illustrating the configuration of an OFDMA-based broadband mobile communication system. The OFDMA communication system is configured to have a single cell structure, and includes a BS 100 and a plurality of SSs 110, 120 and 130 managed by the BS 100. Signal transmission/reception takes place using an OFDM/OFDMA based communication scheme between the BS 100 and the SSs 110, 120 and 130. Thus, the SSs 110, 120 and 130 and the BS 100 transmit physical channel signals on subcarriers.

OFDMA defines an access scheme of a two-dimensional grid that combines Time Division Access (TDM) with Frequency Division Access (FDM). In OFDMA, data symbols are delivered on subcarriers which form subchannels. Depending on system situation, a predetermined number of subcarriers form one subchannel.

For application of Time Division Duplexing (TDD) to the OFDMA communication system, ranging is required to acquire accurate timing synchronization between the SS and the BS and adjust the reception power of the BS on the uplink. In each OFDMA frame a ranging channel has a plurality of subchannels for transmitting a ranging signal.

Ranging in the IEEE 802.16d/e communication system will be described below. The ranging is classified into initial ranging for acquiring physical layer timing synchronization and periodic ranging for maintenance and management.

The initial ranging is the process of acquiring a correct timing offset between the BS and the SS and initially adjusting a transmit power. Upon power-on, the SS acquires downlink synchronization from a received downlink preamble signal. Then the SS performs the initial ranging with the BS to adjust an uplink time offset and transmit power. The IEEE 802.16d/e communication systems use the OFDM/OFDMA communication scheme. Thus, they perform a ranging procedure by transmitting a randomly selected ranging code on a plurality of subchannels.

The periodic ranging is the process of periodically tracking the uplink timing offset and received signal strength after the initial ranging. The SS randomly selects one of ranging codes allocated for the periodic ranging in the ranging procedure.

A description of transmitting a ranging signal will now be provided.

FIG. 2 is a block diagram illustrating a ranging code generator used in a typical TDD/OFDMA system. A Pseudorandom Noise (PN) code generated from a Pseudo Random Binary Sequence (PRBS) generator is used as a ranging code. The generator polynomial for generating a PN code is given as $$G(x)=1+x^1+x^4+x^7+x^{15} \qquad \text{Equation 1}$$

A register is initialized to 00101011 (binary) and a 7-bit cell identification (ID) number. The SS acquires the cell ID number from a downlink preamble signal or broadcast information.

For a ranging code length of N bits, codes are generated for each ranging mode as follows.

A long sequence is generated under synchronization of $1360^{th}$ through $(N \times K1)^{th}$ clock pulses from the PRBS generator. The long sequence is divided into K1 N-bit codes for use in initial ranging. For handoff ranging, a long sequence generated under synchronization of $(N \times K1+1)^{th}$ through $N \times (K1+K2)^{th}$ clock pulses from the PRBS generator is divided into K2 N-bit codes. K3 N-bit codes are used for periodic ranging, which are created by dividing a long sequence generated under synchronization of $N \times (K1+K2+1)^{th}$ through $N \times (K1+K2+K3)^{th}$ clock pulses from the PRBS generator by N bits. For bandwidth request ranging, a long sequence generated under synchronization of $(N \times K1+K2+K3+1)^{th}$ through $N \times (K1+K2+K3+K4)^{th}$ clock pulses from the PRBS generator is divided into K4 N-bit codes. (K1, K2, K3 and K4 are number of codes).

FIG. 3 is a block diagram illustrating a ranging transmitter in an SS in a conventional TDD/OFDMA communication system.

Referring to FIG. 3, upon receipt of information about an SS-intended ranging mode (e.g. initial ranging, periodic ranging, etc.), a ranging code generator 301 generates a randomly selected ranging code. A ranging channel generator 302 allocates the ranging code to subcarriers. The subcarrier allocation amounts to providing each element or bit of the ranging code to a corresponding input (subcarrier position) of anInverse Fast Fourier Transform (IFFT) processor 303. 0s are padded at subcarrier positions to which the ranging code is not allocated. The IFFT processor 303 generates time-domain signals by IFFT-processing the signal from the ranging channel generator 302. A parallel-to-serial (P/S) converter 304 converts the parallel time-domain signals to serial data. A Cyclic Prefix (CP) inserter 305 inserts a CP into the data stream, thereby creating a baseband ranging signal. While not shown, the baseband ranging signal is processed into a transmittable Radio Frequency (RF) signal and wirelessly transmitted through an antenna.

A ranging channel pattern as defined by the IEEE 802.16e is illustrated in FIG. 4 in which a total of 144 tones (subcarriers) used for transmission of the ranging signal reside in six bands that are separated from each other, each band including 24 successive subcarriers.

Reception of the ranging signal will be described below.

FIG. 5 is a block diagram illustrating a ranging receiver in a BS in the conventional TDD/OFDMA communication system.

Referring to FIG. 5, a Fast Fourier Transform (FFT) processor 501 FFT-processes an input signal and outputs the resulting frequency-domain signal. That is, the FFT processor 501 demodulates the input signal to subcarrier values. A ranging subchannel extractor 502 extracts subcarrier values with a ranging code loaded thereon from the subcarrier values received from the FFT processor 501. A multiplier 503 multiplies the extracted subcarrier values by ranging code 0 (or Code 0). A multiplier 504 multiplies the extracted subcarrier values by ranging code 1 (Code 1). Similarly, a multiplier 505 multiplies the extracted subcarrier values by ranging code (k−1) (Code (k−1)). Without knowledge of a received ranging code, all possible ranging codes are multiplied by the subcarrier values with the ranging code.

A phase detector 506 detects a timing offset from the product received from the multiplier 503. A phase detector 507 detects a timing offset from the product received from the multiplier 504. Similarly, a phase detector 508 detects a timing offset from the product received from the multiplier 505. The operations of the phase detectors 506 to 508 are modeled as defined by Equation 2 below.

$$\Re(n) = \arg\max_{t_{min}/\theta_{step} \leq n \leq t_{max}/\theta_{step}} \sum_{\substack{m \in [0,M], RNG_{subband} \\ k \in [0,K-1], tone\ index-in-subband}} Y_{m,k} C_{m,k} e^{-j2\pi f(m,k) \times (n\theta_{step})/N_{FFT}} \quad \text{Equation 2}$$

where $Y_{m,k}$ denotes the received signal response of a $k^{th}$ subcarrier in an $m^{th}$ band in FIG. 4, $C_{m,k}$ denotes a ranging code bit allocated to the $k^{th}$ subcarrier in the $m^{th}$ band, f(m,k) denotes the frequency index of the $k^{th}$ subcarrier in the $m^{th}$ band, $N_{FFT}$ denotes an FFT size (for example 1024), and $\theta_{step}$ denotes samples normalized to a step size (expressed in the number of samples normalized to a sampling rate) set for timing offset detection.

In Equation. 2, $\{Y_{m,k}, C_{m,k}\}$ is the product of the FFT processor output by a ranging code, input to a phase detector. This value is multiplied by an exponential function. A variable set in the exponential function is n and n ranges [$t_{min}/\theta_{step}\square\ t_{max}/\theta_{step}$]. n denotes a timing offset range to be estimated. Using Equation 2, $\{\Re(n), t_{min}/\theta_{step} \leq n \leq t_{max}/\theta_{step}\}$ is computed over all possible values of n. An n value that maximizes $|\Re(n)|$ is selected as a temporary timing offset, $n_{est}$.

Peak detectors 509 to 511 each calculate a Peak-to-Average Power Ratio (PAPR) to verify the temporary timing offset received from a corresponding phase detector and compare the PAPR with a predetermined threshold. If the PAPR is greater than the threshold, the temporary timing offset is decided as a timing offset estimate. If the PAPR is less than the threshold, the temporary timing offset is discarded and it is determined that a ranging signal has not been received.

The PAPR is computed using Equation 3 below.

$$PAPR = \frac{|\Re(n_{est})|^2}{\text{average}\{|\Re(n)|^2, t_{min}/\theta_{step} \leq n \leq t_{max}/\theta_{step}\}} \quad \text{Equation 3}$$

As described above, the conventional TDD/OFDMA communication system detects a ranging signal in the manner illustrated in FIG. 5, and suffers from the following problems.

(1) Acutal implementation is difficult because of computational complexity.

The FFT processor 501 and the multipliers 503 to 505 are basic computation blocks and the phase detectors 506 to 508 detect phases using Equation 2. As noted from Equation 2, 1024 exponential calculations are performed on a value received from a multiplier for one n value and accumulated. Then a maximum value is selected as a temporary timing offset. The peak detectors 509 to 511 calculate PAPRs to verify the temporary timing offsets. The implementation complexity is illustrated in Table 1 below.

TABLE 1

| Real multiplication | FFT reception (Radi × 2 FFT) | Code Multiplication | Phase Test | Peak Test | Total computation |
|---|---|---|---|---|---|
| Conventional | $N_{FFT} \log_2 N_{FFT}$ | 2 × Number_of_Codes × Code_Size | 2 × Number_of_Codes × Code_Size × $N_{FFT}$ | 2 × Number_of_Codes × Code_Size | 9.46E6 |

In Table 3 it is assumed that:
$N_{FFT}$: FFT size (e.g., 1024)
Number_of_Codes: the number of ranging codes (e.g., 32)
Code_Size: the length of ranging codes (e.g., 144).

As illustrated in Table 1, according to the IEEE 802.16e, 3(ranging type)×9.46E6(computation volume)=28.4E6 real multiplications occur every 5 msec, or 5679E6 floating point calculations take place every second. Therefore, the conventional ranging detection is very difficult to implement.

(2) Ranging reception performance decreases at low Carrier-to-Interference plus Noise Ratio (CINR). Since the ranging channel is not transmitted over the total frequency band, the timing offset estimation can be incorrect.

To be more specific, conventionally, the response of a channel whose phase is rotated by a timing offset in the frequency domain is achieved and then converted to a time-domain channel response, thereby detecting the shift of the time-domain channel response. As described earlier with reference to FIG. 4, since the ranging code is loaded only in some bands, the frequency characteristic of an acquired channel is limited. Meanwhile, conversion of a channel value to the time domain is equivalent to passing through a filter configured in correspondence with a ranging subchannel. Therefore, the output of the phase detector is the convolution of the time response of an ideal channel with a filter coefficient. That is, the phase detector outputs an incorrect timing offset. Considering the effects of noise, the performance is worsened. In a cellular system, many terminals must operate at a low CINR due to inter-cell interference. Since the CINR is a function of distance in constant transmit power and the same path loss, abnormal ranging reception at a low CINR reduces cell radius.

SUMMARY OF THE INVENTION

An object of the present invention is to substantially solve at least the above problems and/or disadvantages and to provide at least the advantages below. Accordingly, an object of the present invention is to provide an apparatus and method for reducing a computation requirement for ranging signal detection in an OFDMA mobile communication system.

Another object of the present invention is to provide an apparatus and method for improving the performance of detecting a ranging signal in an OFDMA mobile communication system.

The above objects are achieved by providing an apparatus and method for receiving a ranging signal in an OFDMA mobile communication system.

According to an embodiment of the present invention, in a base station (BS) apparatus of a broadband mobile communication system, a ranging subchannel extractor extracts sub-carrier values with a ranging signal from an FFT signal. A plurality of multipliers code-demodulate the sub-carrier values by multiplying them by a plurality of ranging codes. Each of a plurality of correlators calculates a plurality of differential correlations in a code-demodulated signal received from a corresponding multiplier. Each of a plurality of IFFT processors IFFT-processes differential correlations received from a corresponding correlator by mapping the differential correlations to predetermined subcarriers. Each of a plurality of maximum value detectors detects a maximum value in an IFFT signal received from a corresponding IFFT processor and calculates a timing offset using an IFFT output index having the maximum value.

According to another aspect of the present invention, in a receiving method in a base station of a broadband mobile communication system, subcarrier values with a ranging signal are extracted from an FFT signal. The sub-carrier values are multiplied by a plurality of ranging codes, for code modulation. A plurality of differential correlations are calculated for each of the code-demodulated signals and IFFT-processed by mapping the differential correlations to predetermined subcarriers. A maximum value is detected in each of the IFFT signals and a timing offset is calculated using an IFFT output index having the maximum value.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention is intended to provide a method of reducing a computation requirement for ranging signal detection and improving ranging detection performance even at a low CINR in an OFDMA mobile communication system. In the OFDMA mobile communication system, an SS transmits a predetermined signal such as a ranging signal, a pilot signal or a preamble signal to a BS, for uplink synchronization.

The present invention as described below is applicable without limitation to any TDD-OFDMA system that acquires an uplink synchronization using a predetermined signal such as a ranging signal.

Figure 6:
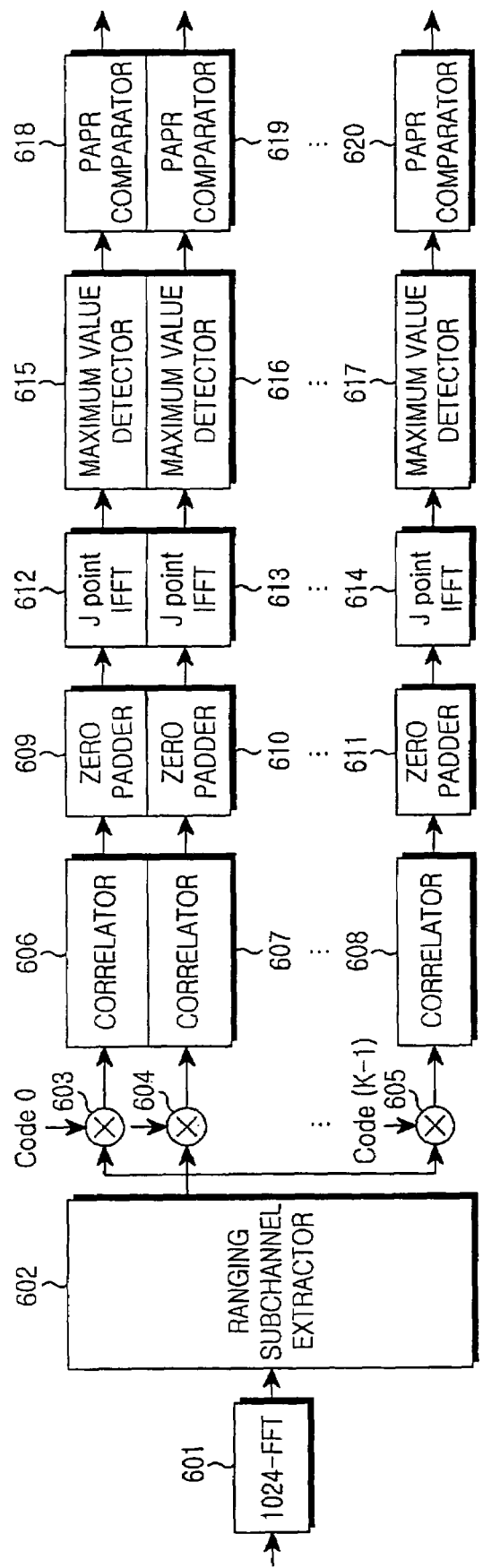
FIG. 6 is a block diagram illustrating a ranging receiver in a BS in a TDD/OFDMA communication system according to an embodiment of the present invention.

FIG. 6 is a block diagram illustrating a ranging receiver in a BS in a TDD/OFDMA communication system according to an embodiment of the present invention.

Referring to FIG. 6, an FFT processor 601 FFT-processes a received signal and outputs the resulting frequency-domain signal. That is, the FFT processor 601 demodulates the received signal to subcarrier values. A ranging subchannel extractor 602 extracts subcarrier values with a ranging code among the subcarrier values. A multiplier 603 multiplies the extracted subcarrier values by ranging code 0 (or Code 0). A multiplier 604 multiplies the extracted subcarrier values by ranging code 1 (Code 1). Similarly, a multiplier 605 multiplies the extracted subcarrier values by ranging code (k−1) (Code (k−1)). In this way, the subcarrier values with the ranging code are multiplied by all possible ranging codes (i.e., K codes).

Figure 1:
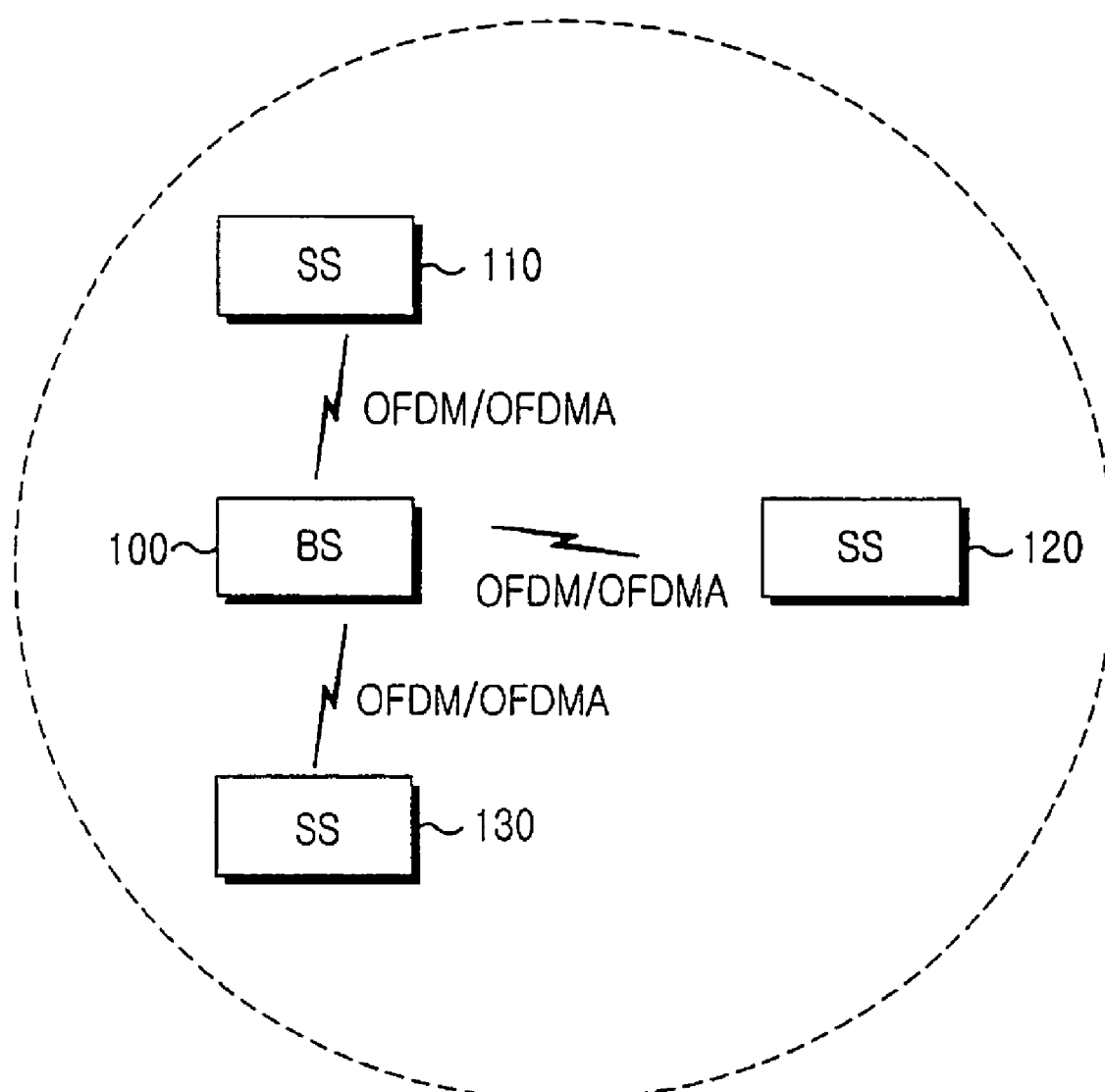
FIG. 1 schematically illustrates the configuration of an OFDMA-based broadband mobile communication system.
Figure 2:
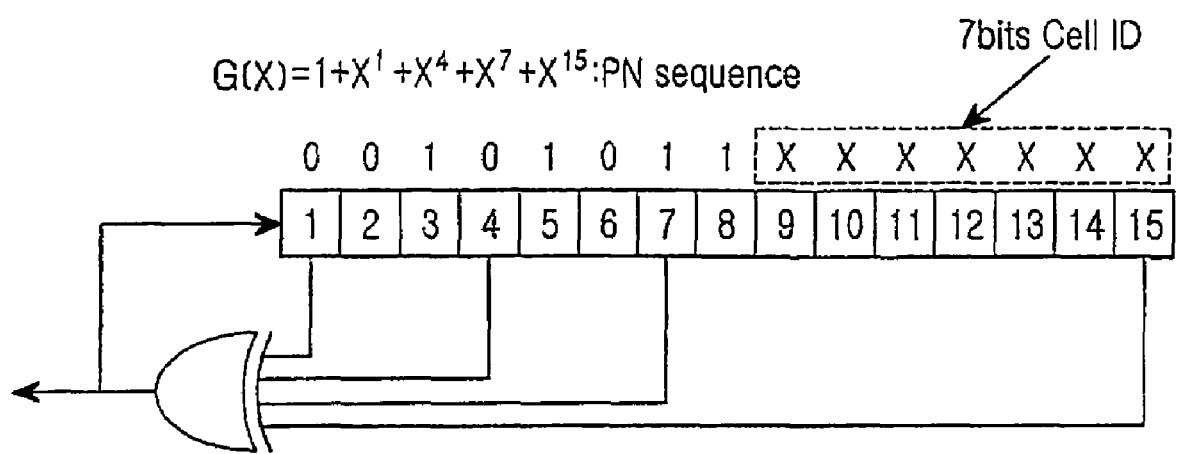
FIG. 2 illustrates a ranging code generator in a typical TDD/OFDMA communication system.
Figure 3:
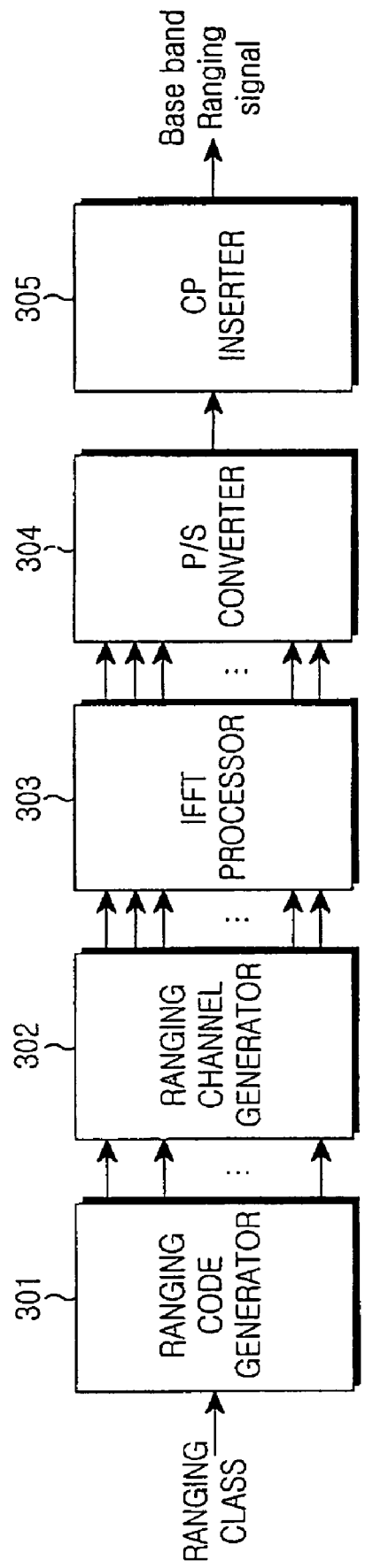
FIG. 3 is a block diagram illustrating a ranging transmitter in an SS in a conventional TDD/OFDMA communication system.
Figure 4:
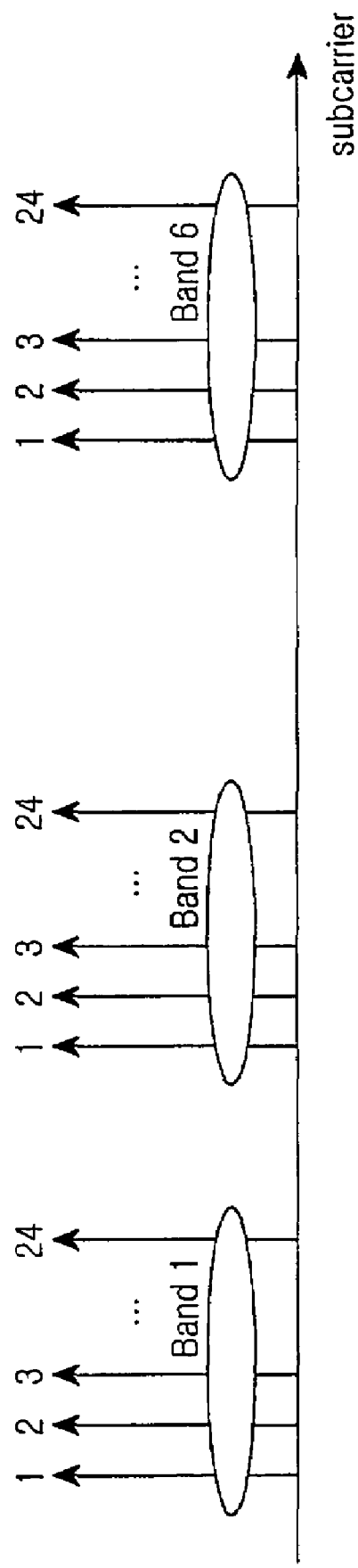
FIG. 4 illustrates a ranging channel pattern in the typical TDD/OFDMA communication system.
Figure 5:
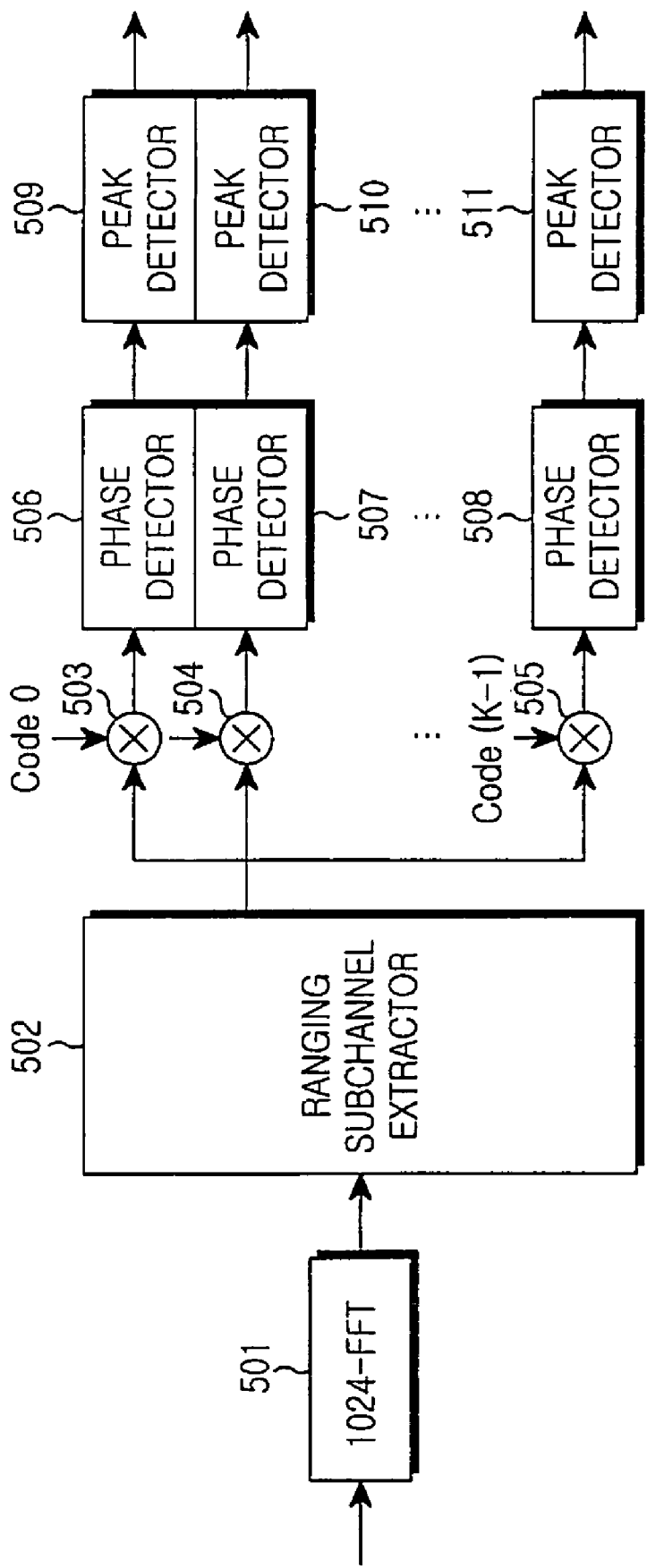
FIG. 5 is a block diagram illustrating a ranging receiver in a BS in the conventional TDD/OFDMA communication system.

The output $Y_{m,k}C_{m,k}$ of the multipliers 603 to 605 represents the frequency characteristic of a channel that the ranging signal has experienced in the case in which physical ranging signals have not collided, and contains a phase rotation component arising from a generated timing offset. $Y_{m,k}$ denotes the received signal response of a $k^{th}$ subcarrier in an $m^{th}$ band and $C_{m,k}$ denotes a ranging code bit allocated to the $k^{th}$ subcarrier in the $m^{th}$ band as shown in FIG. 4.

A correlator (or differential correlator) 606 groups values received from the multiplier 603 according to ranging bands, calculates differential correlations between two subcarriers spaced apart from each other by k ($1 \leq k \leq k_{max}$) (k is a IFFT input index) over all cases in each ranging band, and sums the differential correlations for each k value across the ranging bands, thereby creating $k^{th}$-order differential correlations. Then the correlator 606 finally produces $2 \times k_{max}$ correlations by complex-conjugating the $k^{th}$-order differential correlations. Each correlation $Z_k$ output from the correlator 606 is the sum of differential correlations between subcarriers spaced apart from each other by k, including a phase rotation component corresponding to an uplink timing offset.

In the same manner, the correlator 608 groups values received from the multiplier 605 according to the ranging bands, calculates differential correlations between two subcarriers apart from each other by k ($1 \leq k \leq k_{max}$) over all cases in each ranging band, and sums the differential correlations for each k value across the ranging bands, thereby creating $k^{th}$-order differential correlations. Then the correlator 608 finally produces $2 \times k_{max}$ correlations by complex-conjugating the $k^{th}$-order differential correlations.

The operation of the correlators 606 to 608 are each defined by Equation 4 below.

$$Z_k = \begin{cases} \sum_{l=0}^{5} \sum_{n=0}^{23-k} (Y_{l,n} C_{l,n})(Y_{l,m+k} C_{l,n+k})^*, & 1 \leq k \leq k_{max} \\ Z_{J-k}^*, & J - k_{max} \leq k < J_Z \end{cases} \quad \text{Equation 4}$$

where, $Z_k$: J-point IFFT complex input value k: J-point IFFT input index, $0 \leq k < J$-point Equation 4 is based on the assumption that values corresponding to six ranging bands each having 24 subcarriers, that is, 144 frequency-domain values are fed to each correlator. $Z_k$ is defined as the sum of correlations between subcarriers separated from each other by k. If the subcarriers spaced by k have the same channel characteristics, the amplitude of $Z_k$ is the sum of channel amplitudes, and its phase is the difference between the phases of subcarriers apart from each other by k affected by a timing offset. The number of summing ($\Sigma$) operations varies depending on a k value. This is related to the reliability of information. As k decreases, the correlation between adjacent subcarriers is higher. Accordingly, as the number of summing operations increase, the value of $Z_k$ also increases in as defined by Equation 4. Therefore, the reliability of $Z_k$ is increased. Each ranging band includes 24 successive subcarriers, 23 $Z_k$ values are available since k ranges from 1 to 23. Although a phase difference can be obtained with a negative value of k, the phase difference is equivalent to the complex conjugate of $Z_k$. Hence, $Z_k$ for k ranging from −1 to −23 is easily achieved without re-computing Equation 4. As a result, a total of 46 $Z_k$ values are output from each correlator. These $Z_k$ values are symmetrical in the form of a triangle centering on 0.

Each of zero padders 609 to 611 provides the $2 \times k_{max}$ correlations received from a corresponding correlator to appropriate inputs of a corresponding J-point IFFT processor and pads zeros in non-allocated inputs of the IFFT processor. For $k_{max}=23$, zero-padding positions $Z_k$ are defined by Equation 5.

$$Z_k = 0, k=0, 24 \leq k < j-24 \quad \text{Equation 5}$$

J-point IFFT processors 612 to 614 IFFT-process signals received from their corresponding zero padders 609 to 611 and output time-domain signals. In the present invention, the IFFT size J can be selected from $$J \in \{2^3, 2^4, 2^5, \ldots, N_{FFT}\}$$

Figure 7:
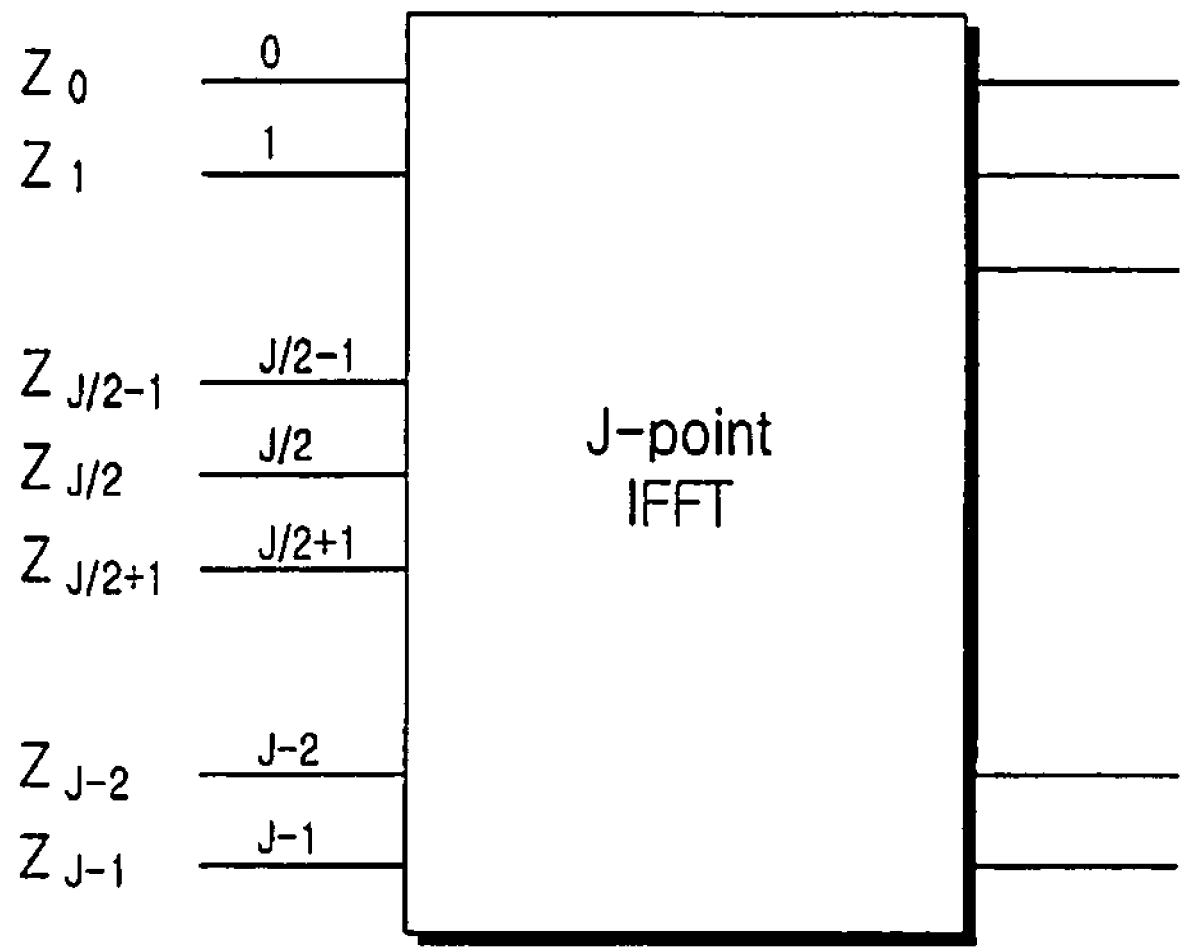
FIG. 7 illustrates a J-point IFFT processor and its inputs according to an embodiment of the present invention.

FIG. 7 illustrates a J-point IFFT processor and its inputs according to an embodiment of the present invention.

Referring to FIG. 7, the inputs of the J-point IFFT processor are $\{Z_0, Z_1, \ldots, Z_{J/2-1}, Z_{J/2}, Z_{J/2+1}, \ldots, Z_{J-2}, Z_{J-1}\}$. The output of the J-point IFFT processor is the square of a sinc function due to the waveform of the input signal $Z_k$, characteristic of a shifted maximum value caused by the uplink timing offset.

Therefore, maximum value detectors 615 to 617 (as shown in FIG. 6) each detects a maximum value from the signal $|sinc|^2$ received from a corresponding J-point IFFT processor and calculates a temporary timing offset using an IFFT output index with the maximum value.

Let the output of the J-point IFFT processor be denoted by $z_n$. Then, the maximum value detector operates as defined by Equation 6 below.

$$n = \arg\max_{0 \leq n \leq J-1} \{|z_n|^2\} \quad \text{Equation 6}$$

$$\Delta t_{offset} = \begin{cases} DR \times n, & \text{if } n \leq \frac{j}{2} \\ DR \times n - N_{FFT}, & \text{if } n > \frac{j}{2} \end{cases}$$

where $$DR(\text{decimation ratio}) = \frac{N_{FFT}}{J}$$

Each of PAPR comparators 618 to 620 calculates a PAPR using Equation 7 to verify the temporary timing offset received from a corresponding maximum value detector, and compares the PAPR with a predetermined threshold. If the PAPR exceeds the threshold, the PAPR comparator outputs the temporary timing offset as a timing offset estimate $\Delta t_{offset, final}$.

$$\Delta t_{offset, final} = \begin{cases} \Delta_{offset}, & \text{if } PAPR \geq \text{threshold} \\ N/A, & \text{others} \end{cases} \quad \text{Equation 7}$$

where threshold: the specific value assigned to BS $$PAPR = \frac{\max\{|IFFT\{Z_k\}|^2\}}{\text{average}\{|IFFT\{Z_k\}|^2\}}$$

Figure 8:
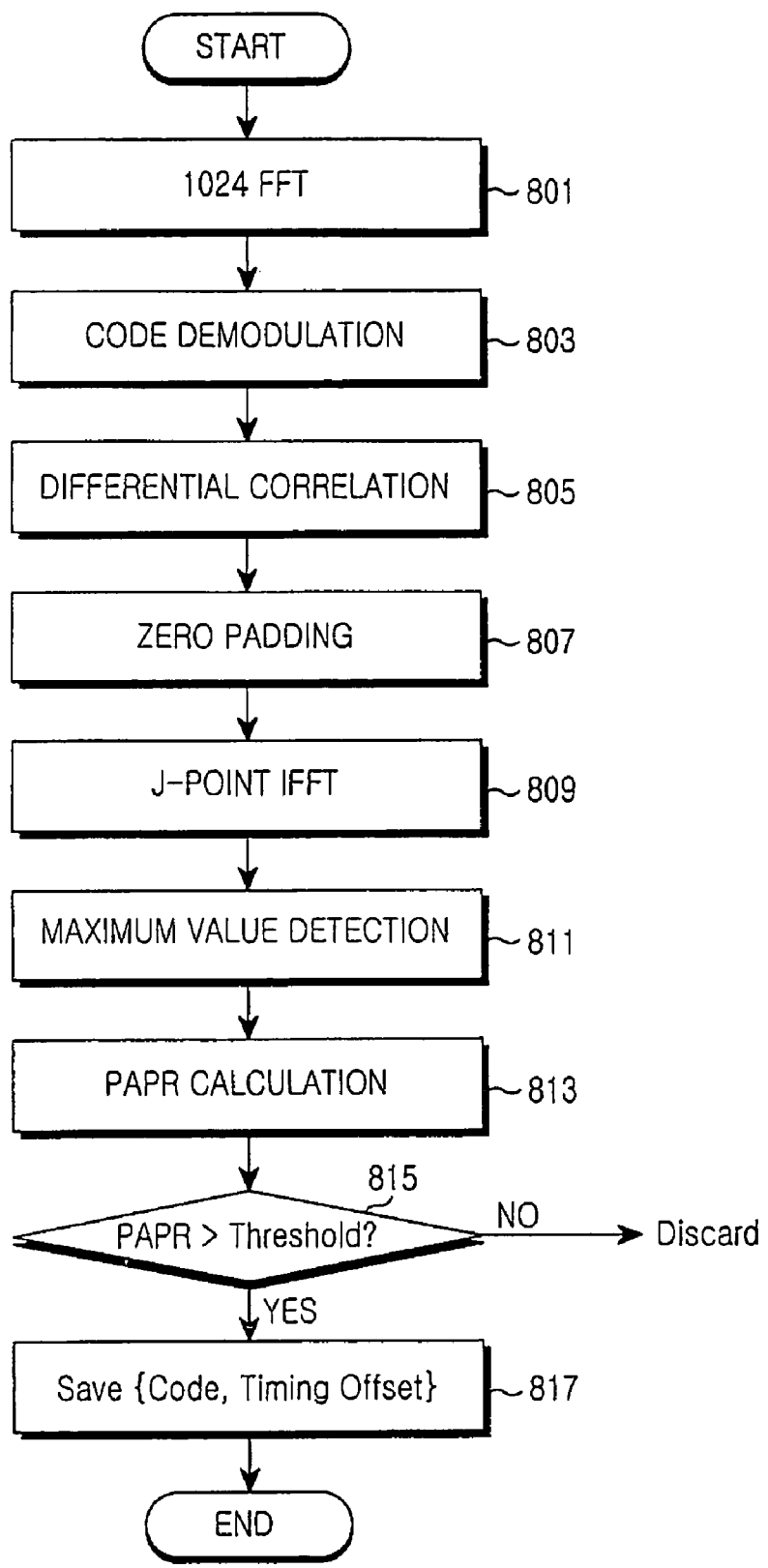
FIG. 8 is a flowchart illustrating a ranging signal detection operation in the BS in the TDD/OFDMA communication system according to the embodiment of the present invention.

FIG. 8 is a flowchart illustrating a ranging detection operation in the BS in the TDD/OFDMA communication system according to the embodiment of the present invention.

Referring to FIG. 8, the BS demodulates a received signal to subcarrier values using an FFT in step 801 and multiplies the subcarriers by all possible ranging codes in step 803.

In step 805, the BS groups each of the ranging code-demodulated signals according to ranging bands, calculates differential correlations between subcarriers spaced apart from each other by k ($1 \leq k \leq k_{max}$) over all possible cases in each ranging band, and sums the differential correlations for each k value across the ranging bands, resulting in $k^{th}$-order differential correlations, and then complex-conjugates the $k^{th}$-order differential correlations. Thus, $2 \times k_{max}$ correlations are produced for each ranging code-demodulated signal. For 6 ranging bands each having 24 subcarriers, let the received signal response of an $n^{th}$ subcarrier in an $1^{th}$ band be denoted by $Y_{1,n}$ and the ranging code bit allocated to the $n^{th}$ subcarrier in the $1^{th}$ band be denoted by $C_{1,n}$. Then $2 \times k_{max}$ correlations calculated for one ranging code-demodulated signal are computed using Equation 8 below.

$$Z_k = \begin{cases} \sum_{l=0}^{5} \sum_{n=0}^{23-k} (Y_{l,n} C_{l,n})(Y_{l,m+k} C_{l,n+k})^*, & 1 \leq k \leq k_{max} \\ Z_{J-k}^*, & J - k_{max} \leq k < J \end{cases} \quad \text{Equation 8}$$

where, $Z_k$: J-point IFFT complex input value k: J-point IFFT input index, $0 \leq k < J$-point where $k_{max}$ is 23 because each band has 24 successive subcarriers.

In step 807, the BS allocates the $2 \times k_{max}$ correlations for each ranging code to subcarriers. At the same time, subcarriers without the correlations are padded with zeroes. For example, if $k_{max}=23$, zero-padded subcarriers $Z_k$ are determined using Equation 9 below.

$$Z_k=0, k=0, 24 \leq k < j-24 \qquad \text{Equation 9}$$

After the subcarrier allocation, the BS performs a J-point IFFT operation on each of the subcarrier-allocated signals in step 809. The IFFT size J is a system operation parameter. The resulting IFFT signal is the square of a sinc function has a shifted maximum value according to a timing offset.

Therefore, the BS detects a maximum value from each IFFT signal and calculates a timing offset using an IFFT output index with the maximum value in step 811.

If the IFFT signal is $z_n$, the timing offset is computed using Equation 10 below.

$$n = \arg\max_{0 \leq n \leq J-1} \{|z_n|^2\} \qquad \text{Equation 10}$$

$$\Delta t_{offset} = \begin{cases} DR \times n, & \text{if } n \leq \frac{j}{2} \\ DR \times n - N_{FFT}, & \text{if } n > \frac{j}{2} \end{cases}$$

where $$DR(\text{decimation ratio}) = \frac{N_{FFT}}{J}$$

In step 813, the BS calculates the PAPR of each IFFT signal using Equation 11 below.

$$\Delta t_{offset,final} = \begin{cases} \Delta_{offset}, & \text{if } PAPR \geq \text{threshold} \\ N/A, & \text{others} \end{cases} \qquad \text{Equation 11}$$

where threshold: the specific value assigned to BS $$PAPR = \frac{\max\{|IFFT\{Z_k\}|^2\}}{\text{average}\{|IFFT\{Z_k\}|^2\}}$$

The BS then compares the PAPR with a predetermined threshold in step 815. If the PAPR exceeds the threshold, the BS decides a timing offset corresponding to the PAPR as a timing offset estimate $\Delta t_{offset,final}$ and stores the timing offset and its associated ranging code in step 817. If the PAPR is less than the threshold, the BS discards the timing offset.

Compared to the conventional ranging detection method, the ranging method according to present invention provides better reception performance. A comparison in reception performance between the conventional technology and the present invention is given in Table 2 below.

CINR denotes a Carrier-to-Interference plus Noise Ratio, AWGN denotes Additive White Gaussian Noise, PED Denotes a pedestrian environment and Veh denotes a Vehicular environment. Table 3 below illustrates reception ranging reception performance for each J-point IFFT size according to the present invention.

TABLE 3

| CINR | IFFT size | AWGN | Ped A, 3 Km/h | Ped B, 10 Km/h | Veh A, 60 Km/h | Veh B, 120 Km/h |
|---|---|---|---|---|---|---|
| −5 dB | 64 | 0.9949 | 0.9984 | 0.8972 | 0.8931 | 0.8016 |
|  | 128 | 0.9980 | 0.9992 | 0.9247 | 0.9178 | 0.8390 |
|  | 256 | 0.9989 | 0.9999 | 0.9304 | 0.9259 | 0.8480 |
|  | 512 | 0.9987 | 0.9999 | 0.9294 | 0.9250 | 0.8492 |
| 0 dB | 64 | 1.0000 | 1.0000 | 0.9988 | 0.9994 | 0.9441 |
|  | 128 | 1.0000 | 1.0000 | 0.9995 | 0.9997 | 0.9579 |
|  | 256 | 1.0000 | 1.0000 | 0.9996 | 0.9995 | 0.9609 |
|  | 512 | 1.0000 | 1.0000 | 0.9992 | 0.9996 | 0.9596 |
| 5 dB | 64 | 1.0000 | 1.0000 | 0.9998 | 1.0000 | 0.9559 |
|  | 128 | 1.0000 | 1.0000 | 1.0000 | 1.0000 | 0.9712 |
|  | 256 | 1.0000 | 1.0000 | 1.0000 | 1.0000 | 0.9724 |
|  | 512 | 1.0000 | 1.0000 | 1.0000 | 1.0000 | 0.9738 |

Particularly, the present invention is less complex and requires fewer computations than the conventional technology, as illustrated in Table 4 below.

TABLE 2

| CINR | AWGN | | Ped A, 3 Km/h | | Ped B, 10 Km/h | | Veh A, 60 Km/h | | Veh B, 120 Km/h | |
|---|---|---|---|---|---|---|---|---|---|---|
|  | Conventional | Present | Conventional | present | Conventional | present | Conventional | present | Conventional | present |
| −5 dB | 1.0000 | 0.9989 | 0.9995 | 0.9999 | 0.6578 | 0.9304 | 0.8732 | 0.9259 | 0.7959 | 0.8480 |
| 0 dB | 1.0000 | 1.0000 | 1.0000 | 1.0000 | 0.9171 | 0.9996 | 0.9731 | 0.9995 | 0.9557 | 0.9609 |
| 5 dB | 1.0000 | 1.0000 | 1.0000 | 1.0000 | 0.9306 | 1.0000 | 0.9789 | 1.0000 | 0.9572 | 0.9724 |

TABLE 4

| Real multiplication | FFT reception (Radi × 2 FFT) | Code Multiplication | Diff. demod | IFFT (Radi × 2) | Total computation $N_J = 126$ | Total computation $N_J = 256$ |
|---|---|---|---|---|---|---|
| Present invention | $N_{FFT}\log_2 N_{FFT}$ | 2 × Num_of_Codes × Code_Size | Num_of_Codes × 3312 | Num_of_Codes × $N_J \log_2 N_J$ | 1.09E6 | 2.07E6 |

Where it is assumed that:
$N_{FFT}$: FFT size (e.g., 1024)
Number_of_Codes: the number of ranging codes (e.g., 32)
Code_Size: the length of ranging codes (e.g., 144).

As illustrated in Table 4, for an $N_J$-IFFT size of 126, the computation volume is 1.09E6 and for an $N_J$-IFFT size of 256, the computation volume is 2.07E6 in the present invention. On the other hand, the conventional technology has a computation volume of 9.46E6 as illustrated in Table 1, which is about 900% of the computation volume of the present invention.

As described above, the present invention advantageously improves the reception performance of a ranging signal and reduces a computation requirement for ranging signal detection.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A base station apparatus in a broadband mobile communication system, comprising:
a ranging subchannel extractor for extracting subcarrier values with a ranging signal from a fast Fourier transform (FFT) signal;
a plurality of multipliers for code-demodulating the subcarrier values by multiplying the subcarrier values by a plurality of ranging codes;
a plurality of correlators, each for calculating a plurality of differential correlations in a code-demodulated signal received from a corresponding multiplier;
a plurality of inverse fast Fourier transform (IFFT) processors, each for IFFT-processing differential correlations received from a corresponding correlator by mapping the differential correlations to predetermined subcarriers; and
a plurality of maximum value detectors, each for detecting a maximum value in an IFFT signal received from a corresponding IFFT processor and calculating a timing offset using an IFFT output index having the maximum value;
wherein each of the correlators calculate $2 \times k_{max}$ differential correlations ($Z_k$) by $$Z_k = \begin{cases} \sum_{l=0}^{5} \sum_{n=0}^{23-k} (Y_{l,n} C_{l,n})(Y_{l,n+k} C_{l,n+k})^*, & l \leq k \leq k_{max} \\ Z_{J-k}^*, & J - k_{max} \leq k < J \end{cases}$$

where,
$Z_k$: J-point IFFT complex input value
k: J-point IFFT input index, $0 \leq k < J$-point and wherein k is an input index of a J-point IFFT processor, L+1 is a number of subbands, N+1 is a number of subcarriers per subband, $Y_{1,n}$ is a received signal response of an $n^{th}$ subcarrier in an $1^{th}$ subband, $C_{1,n}$ is a ranging code bit allocated to the $n^{th}$ subcarrier in the $1^{th}$ subband, and $k_{max}$=N.

2. The base station apparatus of claim 1, wherein each of the correlators groups a code-demodulated signal received from a corresponding multiplier according to predetermined subbands, calculates differential correlations between two subcarriers spaced apart by k (where k is an index defined by $1 \leq k \leq k_{max}$) over all cases, produces $k^{th}$-order differential correlations by summing the differential correlations across the ranging bands, complex-conjugates the $k^{th}$-order differential correlations and outputs $2 \times k_{max}$ correlations to a corresponding IFFT processor.

3. The base station apparatus of claim 1, further comprising a plurality of peak-to-average power ratio (PAPR) comparators, each for verifying a timing offset calculated by a corresponding maximum value detector by calculating the PAPR of an IFFT signal received from a corresponding IFFT processor and comparing the PAPR with a predetermined threshold.

4. The base station apparatus of claim 1, wherein zeroes are padded at IFFT processor inputs to which the differential correlations are not mapped.

5. The base station apparatus of claim 1, wherein the maximum value detectors calculate the timing offset ($\Delta t_{offset}$) by $$n = \arg\max_{0 \leq n \leq J-1} \{|z_n|^2\}$$

$$\Delta t_{offset} = \begin{cases} DR \times n, & \text{if } n \leq \frac{j}{2} \\ DR \times n - N_{FFT}, & \text{if } n > \frac{j}{2} \end{cases}$$

wherein $z_n$ is an IFFT signal and DR (Decimation Ratio) is equal to $N_{FFT}/J$ (where J is an input index and $N_{FFT}$ is an FFT size).

6. The base station apparatus of claim 1, wherein the IFFT signals output from the IFFT processors are defined by a sinc function.

7. A receiving method in a base station in a broadband mobile communication system, comprising the steps of:
extracting subcarrier values with a ranging signal from a fast Fourier transform (FFT) signal;
code-demodulating the sub-carrier values by multiplying the subcarrier values by a plurality of ranging codes and forming code-demodulated signals;
calculating a plurality of differential correlations in each of the code-demodulated signals;
inverse fast Fourier transform (IFFT)-processing the differential correlations for each of the plurality of ranging codes by mapping the differential correlations to predetermined subcarriers and outputting IFFT signals; and
detecting a maximum value in each of the IFFT signals and calculating a timing offset using an IFFT output index having the maximum value;
wherein $2 \times k_{max}$ differential correlations ($Z_k$) are calculated by $$Z_k = \begin{cases} \sum_{l=0}^{L} \sum_{n=0}^{N-k} (Y_{l,n} C_{l,n})(Y_{l,m+k} C_{l,n+k})^*, & 1 \le k \le k_{max} \\ Z_{J-k}^*, & J - k_{max} \le k < J \end{cases}$$

where, $Z_k$: $J$-point $IFFT$ complex input value $k$: $J$-point $IFFT$ input index, $0 \le k < J$-point and wherein k is an input index of a J-point IFFT, L+1 is a number of subbands, N+1 is a number of subcarriers per subband, $Y_{1,n}$ is a received signal response of an $n^{th}$ subcarrier in an $1^{th}$ subband, $C_{1,n}$ is a ranging code bit allocated to the $n^{th}$ subcarrier in the $1^{th}$ subband and $k_{max}=N$.

8. The receiving method of claim 7, wherein the differential correlation calculation step comprises:
grouping each of the code-demodulated signals according to predetermined subbands,
calculating differential correlations between two subcarriers spaced apart by k (where $1 \le k \le k_{max}$) over all cases, forming $k^{th}$-order differential correlations by summing the differential correlations across the ranging bands,
and obtaining $2 \times k_{max}$ correlations by complex-conjugating the $k^{th}$-order differential correlations.

9. The receiving method of claim 7, further comprising verifying the reliability of each timing offset by calculating a peak-to-average power ratio (PAPR) of each of the IFFT signals and comparing the PAPR with a predetermined threshold.

10. The receiving method of claim 7, further comprising the step of padding zeroes at IFFT inputs to which the differential correlations are not mapped.

11. The receiving method of claim 7, wherein the timing offset ($\Delta t_{offset}$) is calculated by $$n = \arg \max_{0 \le n \le J-1} \{|z_n|^2\}$$

$$\Delta t_{offset} = \begin{cases} DR \times n, & \text{if } n \le \frac{j}{2} \\ DR \times n - N_{FFT}, & \text{if } n > \frac{j}{2} \end{cases}$$

wherein $z_n$ is an IFFT signal and DR (Decimation Ratio) is equal to $N_{FFT}/J$ (where J is an input index and $N_{FFT}$ is an FFT size).

12. The receiving method of claim 7, wherein the IFFT signals are a sinc function.

13. An apparatus for estimating a timing offset in a broadband mobile communication system, comprising:
a channel extractor for extracting subcarrier values of a predetermined channel from a fast Fourier transform (FFT) signal;
a correlator for calculating a plurality of differential correlations from the subcarrier values;
an inverse fast Fourier transform (IFFT) processor for IFFT-processing the differential correlations by mapping the differential subcarriers to predetermined subcarriers and outputting an IFFT signal; and
a maximum value detector for detecting a maximum value from the IFFT signal and estimating a timing offset using an IFFT output index having the maximum value;
wherein the correlator calculates $2 \times k_{max}$ differential correlations ($Z_k$) by $$Z_k = \begin{cases} \sum_{l=0}^{L} \sum_{n=0}^{N-k} (Y_{l,n} C_{l,n})(Y_{l,m+k} C_{l,n+k})^*, & 1 \le k \le k_{max} \\ Z_{J-k}^*, & J - k_{max} \le k < J \end{cases}$$

where, $Z_k$: $J$-point $IFFT$ complex input value $k$: $J$-point $IFFT$ input index, $0 \le k < J$-point and wherein k is an input index of a J-point IFFT processor, L+1 is a number of subbands, N+1 is a number of subcarriers per subband, $Y_{1,n}$ is a received signal response of an $n^{th}$ subcarrier in an $1^{th}$ subband, $C_{1,n}$ is a ranging code bit allocated to the $n^{th}$ subcarrier in the $1^{th}$ subband, and $k_{max}=N$.

14. The apparatus of claim 13, wherein the predetermined channel is a ranging channel.

15. The apparatus of claim 13, wherein for the input of the subcarrier values, the correlator calculates differential correlations between two subcarriers spaced by k (where $k \ge 1$) over all cases, produces $k^{th}$-order differential correlations by summing the differential correlations, complex-conjugates the $k^{th}$-order differential correlations and outputs the $k^{th}$-order differential correlations and the complex conjugates.

16. The apparatus of claim 13, further comprising a peak-to-average power ratio (PAPR) comparator for verifying the reliability of the timing offset by calculating the PAPR of the IFFT signal and comparing the PAPR with a predetermined threshold.

17. The apparatus of claim 13, wherein zeroes are padded at subcarriers to which the differential correlations are not mapped.

18. A method of estimating a timing offset in a broadband mobile communication system, comprising the steps of:
extracting subcarrier values of a predetermined channel from a fast Fourier transform (FFT) signal;
calculating a plurality of differential correlations from the subcarrier values;
inverse fast Fourier transform (IFFT)-processing the differential correlations by mapping differential subcarriers to predetermined subcarriers and outputting an IFFT signal; and
detecting a maximum value from the IFFT signal and estimating a timing offset using an IFFT output index having the maximum value;
wherein $2 \times k_{max}$ differential correlations ($Z_k$) are calculated by $$Z_k = \begin{cases} \sum_{l=0}^{L} \sum_{n=0}^{N-k} (Y_{l,n} C_{l,n})(Y_{l,m+k} C_{l,n+k})^*, & 1 \le k \le k_{max} \\ Z_{J-k}^*, & J - k_{max} \le k < J \end{cases}$$

where, $Z_k$: $J$-point $IFFT$ complex input value $k$: $J$-point $IFFT$ input index, $0 \le k < J$-point and wherein k is an input index of a J-point IFFT processor, L+1 is a number of subbands, N+1 is a number of subcarriers per subband, $Y_{1,n}$ is a received signal response of an $n^{th}$ subcarrier in an $1^{th}$ subband, $C_{1,n}$ is a ranging code bit allocated to the $n^{th}$ subcarrier in the $1^{th}$ subband, and $k_{max}$=N.

19. The method of claim 18, wherein the predetermined channel is a ranging channel.

20. The method of claim 18, wherein the differential correlation calculation step comprises calculating differential correlations between two subcarriers spaced by k (where $k \geq 1$) over all cases, and producing $k^{th}$-order differential correlations by summing the differential correlations.

21. The method of claim 18, further comprising the step of verifying the reliability of the timing offset by calculating a peak-to-average power ratio (PAPR) for IFFT signal and comparing the PAPR with a predetermined threshold.

22. The method of claim 18, further comprising the step of padding zeroes at subcarriers to which the differential correlations are not mapped.

* * * * *